(12) United States Patent
Chen

(10) Patent No.: US 8,985,360 B2
(45) Date of Patent: Mar. 24, 2015

(54) CAP FOR DRAINAGE

(71) Applicant: Yen-An Chen, Keelung (TW)

(72) Inventor: Yen-An Chen, Keelung (TW)

(*) Notice: Subject to any disclaimer, the term of this patent is extended or adjusted under 35 U.S.C. 154(b) by 15 days.

(21) Appl. No.: 13/835,156

(22) Filed: Mar. 15, 2013

(65) Prior Publication Data
US 2014/0182745 A1 Jul. 3, 2014

(30) Foreign Application Priority Data

Dec. 27, 2012 (TW) .............................. 101225266 A
Feb. 5, 2013 (TW) .............................. 102202458 A

(51) Int. Cl.
*B67D 7/06* (2010.01)
*F16J 13/12* (2006.01)

(52) U.S. Cl.
CPC .. *B67D 7/06* (2013.01); *F16J 13/12* (2013.01)
USPC ........... 215/309; 215/319; 220/287; 220/288; 220/303; 220/360; 220/367.1; 220/373; 141/311 R; 141/383

(58) Field of Classification Search
CPC ................................... B67D 7/06; F16J 13/12
USPC .............. 220/287, 303, 288, 360, 367.1, 373; 215/309, 319; 141/311 R, 383
See application file for complete search history.

(56) References Cited

U.S. PATENT DOCUMENTS 6,408,887 B2 * 6/2002 Rahimzadeh et al. ...... 138/96 R
2011/0163098 A1 * 7/2011 Gevers et al. .................. 220/288

* cited by examiner

*Primary Examiner* — Elizabeth Volz
(74) *Attorney, Agent, or Firm* — Rosenberg, Klein & Lee

(57) ABSTRACT

A cap for a drain hose and a plurality of bottles with different opening sizes is provided. The cap includes a main body and an extension body. The main body includes a main sleeve, a sleeve for drain hose and a leakage-proof part, wherein the main sleeve is for engaging with a first bottle, the sleeve for drain hose is for engaging with the drain hose, and the leakage-proof part is for closely sealing the opening of the first bottle. The extension body is formed integrally with the main body and extends outwardly from the main body, the extension body including an extension sleeve for engaging with a second bottle, the opening size of the second bottle being larger than the opening size of the first bottle.

9 Claims, 12 Drawing Sheets

CAP FOR DRAINAGE

This application claims the benefits of the Taiwan Patent Applications Serial NO. 101225266 filed on Dec. 27, 2012 and Serial NO. 102202458 filed on Feb. 5, 2013, the subject matters of which are incorporated herein by reference.

BACKGROUND OF THE INVENTION

1. Field of the Invention

The present invention relates to a cap for drainage; more particularly, relates to a cap for drainage from a plurality of bottles with different opening sizes.

2. Description

In daily life, in order to efficiently wash cars or glasses, people usually install hose of dispenser in bottles storing detergent and drain the detergent out with motor or pump so as to spray on and clean vehicles or glasses; hoses of dispense are usually fixed with the bottle via the cap of the bottle. Since people usually blend the detergent on their own, it is easy for people to get a large amount of detergent; thus, big bottles or containers are needed for storing the detergent, which makes it inconvenient to carry.

As a result, in order to solve the problem of inconvenience of carrying big bottles or containers full of self-made detergent, small portion of detergent is in the market.

However, when people need to alternate between bigger bottles and smaller bottles, they have to prepare two dispensers or two caps in different sizes. With different sizes of caps, they need to reinstall the drain hose, which is time-consuming and inconvenient.

Thus, a cap for drainage from a plurality of bottles with different opening sizes is provided according to embodiments of the present invention.

SUMMARY OF THE INVENTION

In prior art, people have to prepare two dispensers or two caps in different sizes in order to alternate between two bottles in different sizes, which is time-consuming and inconvenient. Thus, a cap for drainage from a plurality of bottles with different opening sizes is provided according to embodiments of the present invention.

A cap for a drain hose and a plurality of bottles with different opening sizes is provided according to embodiments of the present invention. The cap includes a main body and an extension body. The main body includes a main sleeve, a sleeve for drain hose and a leakage-proof part, wherein the main sleeve is for engaging with a first bottle, the sleeve for drain hose is for engaging with the drain hose, and the leakage-proof part is for closely sealing the opening of the first bottle. The extension body is formed integrally with the main body and extends outwardly from the main body, the extension body including an extension sleeve for engaging with a second bottle, the opening size of the second bottle being larger than the opening size of the first bottle.

According to an embodiment of the present invention, the cap further includes a valve module; the leakage-proof part further includes a regulation space connecting the main sleeve and the sleeve for drain hose; the main body further includes a holding space connecting the regulation space; the valve module is disposed in the holding space.

According to an embodiment of the present invention, the valve module includes a sealing element, an elastic element and an air valve, the elastic element supporting the sealing element so the sealing element sealing the air valve.

According to an embodiment of the present invention, an air way is formed between the valve module and the holding space, the valve module including an inlet part and an elastic sealing part, the inlet part attached fixedly in the holding space and including at least an inlet hole connecting the air way, the elastic sealing part coupled to the inlet part and elastically sealing the holding space so as to connect the air way with the regulation space when the pressure in the air way is greater than that in the regulation space. Preferably, the inlet part and the elastic sealing part are integrally coupled with each other.

According to an embodiment of the present invention, the valve module includes a check valve.

According to an embodiment of the present invention, the main sleeve is threaded.

According to an embodiment of the present invention, the sleeve for drain hose is threaded.

According to an embodiment of the present invention, the extension sleeve is threaded.

According to an embodiment of the present invention, the leakage-proof part includes an inclined plane for closely sealing the opening of the first bottle.

Since the cap of embodiments of the present invention includes the main sleeve and the extension sleeve and the drain hose can be engaged with the sleeve for drain hose, the main sleeve can engage with bottle with smaller openings and the extension sleeve can engage with bottle with bigger openings, which is convenient.

BRIEF DESCRIPTION OF THE DRAWINGS

Other features and advantages of this invention will become more apparent in the following detailed description of the preferred embodiments of this invention, with reference to the accompanying drawings.

DETAILED DESCRIPTION OF THE PREFERRED EMBODIMENT

The present invention relates to a cap for a drain hose and a plurality of bottles with different opening sizes. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
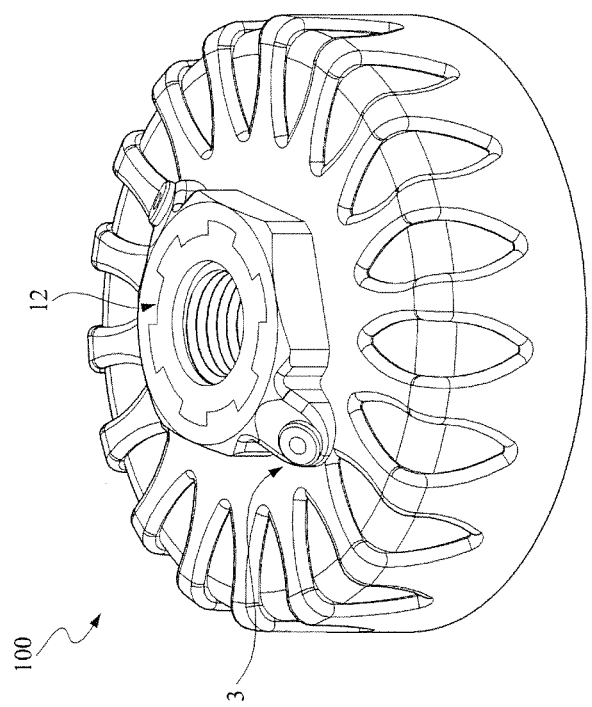
FIG. 1 is a three-dimensional view of a cap according to an embodiment of the present invention.
Figure 2:
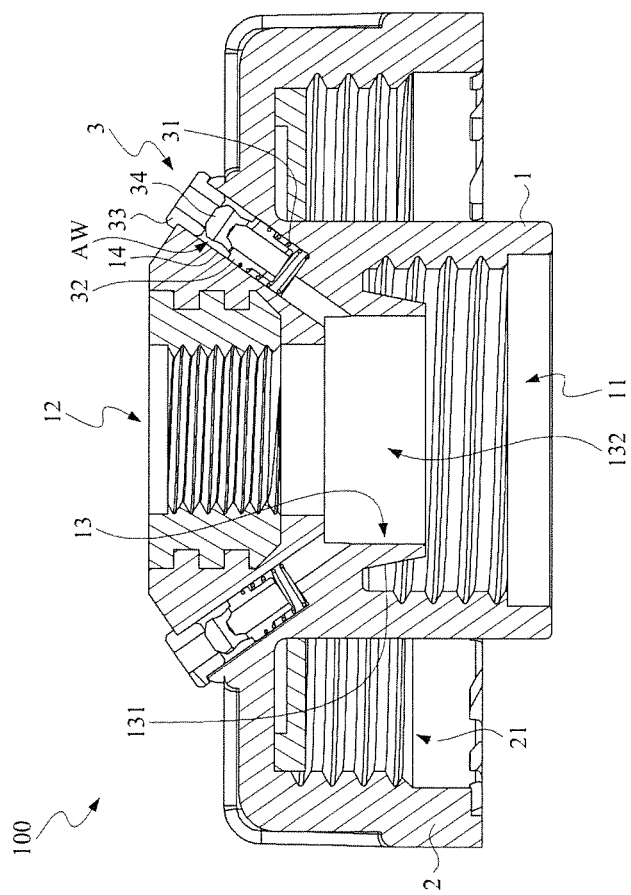
FIG. 2 is a cross-sectional view of a cap according to an embodiment of the present invention.

Refer to FIG. 1 to FIG. 2; FIG. 1 is a three-dimensional view of a cap according to an embodiment of the present invention; FIG. 2 is a cross-sectional view of a cap according to an embodiment of the present invention. A cap 100 includes a main body 1, an extension body 2 and two valve modules 3. The main body 1 includes a main sleeve 11, a sleeve for drain hose 12, a leakage-proof part 13 and two holding spaces 14. The leakage-proof part 13 is disposed between the main sleeve 11 and the sleeve for drain hose 12 and includes a inclined plane 131 and a regulation space 132 connecting the main sleeve 11 and the sleeve for drain hose 12. The holding spaces 14 connect the regulation space 132. The extension body 2 is formed integrally with the main body 1 and extends outwardly from the main body 1, the extension body 2 including an extension sleeve 21.

The main sleeve 11, the sleeve for drain hose 12 and the extension sleeve 21 are all threaded and more specifically, include internal threads.

The valve modules 3 are disposed in the holding spaces 14. The valve modules 3 respectively include an elastic element 31, a supporting element 32, an air valve 33 and a sealing element 34; wherein the elastic element 31 covers the supporting element 32 and the air valve 33 is disposed fixedly around the opening of the holding space 14; thus, the supporting element 32 is supported by the elasticity of the elastic element 31 and pushes the sealing element 34 to the air valve 33 so as to stop liquid flowing from the regulation space 132 and to effectively prevent the liquid in the regulation space 132 from flowing through the holding space 14. Besides, an air way AW is formed between the sealing element 34 and the holding space 14; when the pressure outside is greater than the pressure inside and than the supporting force of the elastic element 31, air from the outside enters the regulation space 132 via the air way AW. The valve module 3 includes a check valve and thus air enters the regulation space 132 in one direction.

Figure 3:
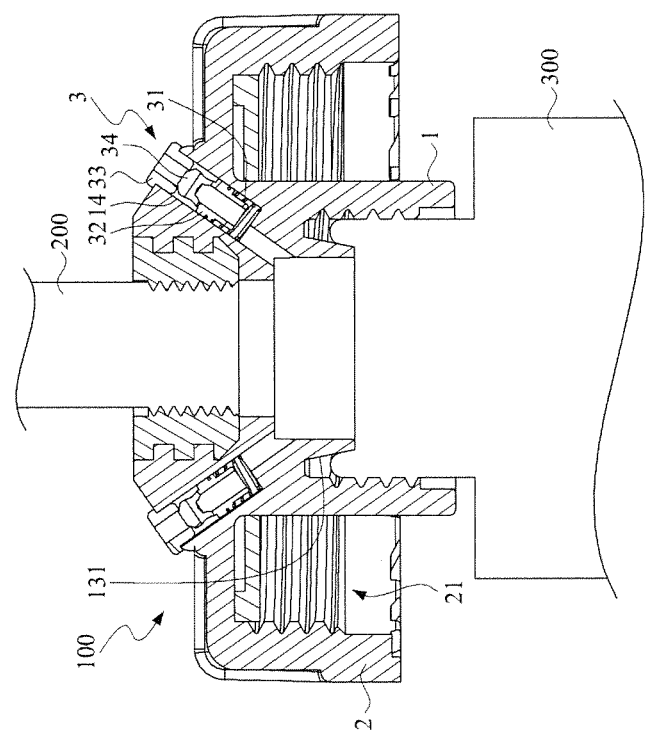
FIGS. 3 and 4 are cross-sectional views of a cap according to a first embodiment of the present invention.
Figure 4:
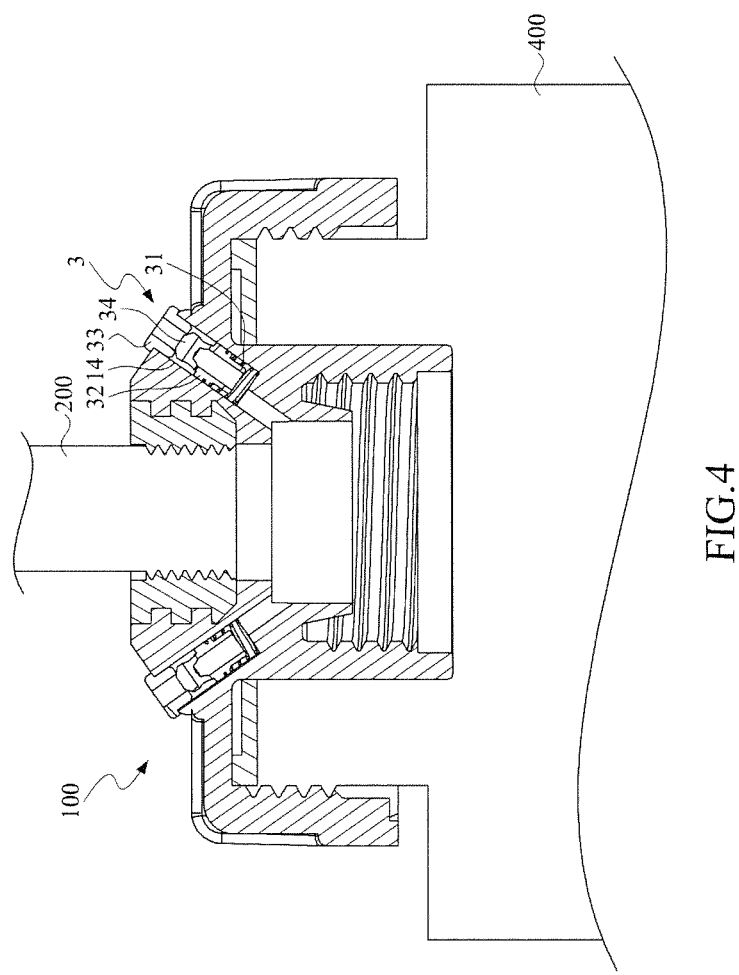

Refer to FIG. 1 to FIG. 4; FIGS. 3 and 4 are cross-sectional views of a cap according to a first embodiment of the present invention. The cap 100 is utilized for a drain hose 200, a first bottle 300 and a second bottle 400. The main sleeve 11 engages with the first bottle 300 and the sleeve for drain hose 12 is coupled to the drain hose 200. A negative pressure is provided from a pump or a motor (not shown) via the drain hose 200 so liquid stored inside the first bottle 300 is drained via the main sleeve 11 and the sleeve for drain hose 12. Since the leakage-proof part 13 includes the inclined plane 131, when the first bottle 300 is engaged with the main sleeve 11, the opening of the first bottle 300 will be sealed closely with the inclined plane 131. The liquid in the first bottle 300 will not leaked from between the opening of the first bottle 300 and the cap 100 during the drainage.

According to other embodiments of the present invention, the drain hose 200 can extend downward via the sleeve for drain hose 200 and reach inside the first bottle 300 or the second bottle 400. That is, on the drain hose 200, there can be a distance between the threads (not shown) for engaging with the sleeve for drain hose 12 and with the drainage opening (not shown). The threads of the drain hose 200 are not limited to be next to the drainage opening.

The extension sleeve 21 engages with the second bottle 400, the opening size of the second bottle 400 being larger than the opening size of the first bottle 300.

When the sleeve for drain hose 12 engages with the drain hose 200 and the main sleeve 11 engages with the first bottle 300, a sealed space (including the regulation space 132) is formed between the cap 100 and the first bottle 300. If the liquid in the first bottle 300 is drained with the drain hose 200, the pressure inside the sealed space is less than the pressure outside and thus is vacuumed. Since the elastic element 31 pushes the sealing element 34 against the air valve 33, air from outside pushes the sealing element 34 via the air valve 33 and enters the regulation space 132. The pressure inside the regulation space 132 is regulated and thus the liquid in the first bottle 300 can be smoothly drained via the drain hose 200.

From the description above, the cap according to the embodiment of the present invention includes the sleeve for drain hose to hold the drain hose in place; the user can switch between the main sleeve and the extension sleeve for bottles with different opening sizes, which is convenient. Besides, the valve module can regulate the pressure of the drain hose and inside the bottle so the liquid in the bottle can be drained smoothly from the drain hose.

Figure 5:
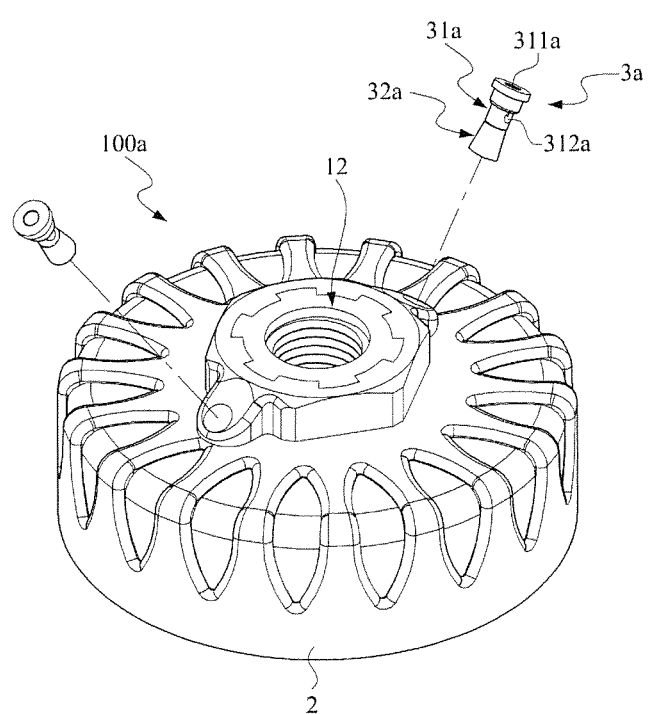
FIG. 5 is a three-dimensional and partial breakdown view of a cap according to a second embodiment of the present invention.
Figure 6:
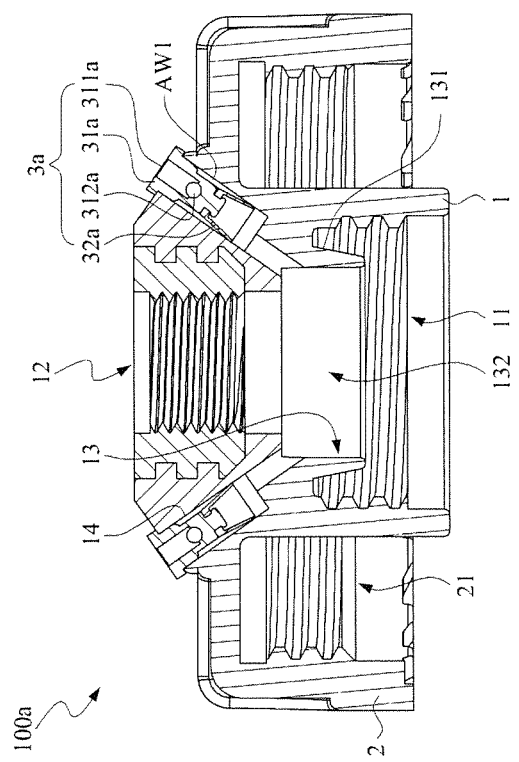
FIG. 6 is a cross-sectional view of the cap according to the second embodiment of the present invention.

Refer to FIG. 5 and FIG. 6; FIG. 5 is a three-dimensional and partial breakdown view of a cap according to a second embodiment of the present invention; FIG. 6 is a cross-sectional view of the cap according to the second embodiment of the present invention. A cap 100a is provided according to the second embodiment of the present invention. The cap 100a is similar to the cap 100 in the first embodiment of the present invention, but the cap 100a includes two valve modules 3a instead of two valve modules 3; therefore, the following only describes the valve modules 3a.

The valve module 3a is disposed in the holding space 14. An air way AW1 is formed between the valve module 3a and the holding space 14. The valve module 3a includes an inlet part 31a and an elastic sealing part 32a. The inlet part 31a is attached fixedly in the holding space 14 and includes an inlet hole 311a and a side hole 312a connecting the air way AW1. The side hole 312a connects the inlet hole 311a and the inlet hole 311a connects the air way AW1 via the side hole 312a. The elastic sealing part 32a is coupled to the inlet part 31a and elastically seals the holding space 14.

When the sleeve for drain hose 12 engages with the drain hose 200 and the main sleeve 11 engages with the first bottle 300, a sealed space (including the regulation space 132) is formed between the cap 100a and the first bottle 300. If the liquid in the first bottle 300 is drained with the drain hose 200, the pressure inside the sealed space is less than the pressure outside and thus is vacuumed. Since the elastic sealing part 32a pushes the holding space 14 elastically, air from outside pushes the elastic sealing part 32a and enters the regulation space 132. The pressure inside the regulation space 132 is regulated and thus the liquid in the first bottle 300 can be smoothly drained via the drain hose 200.

Figure 7:
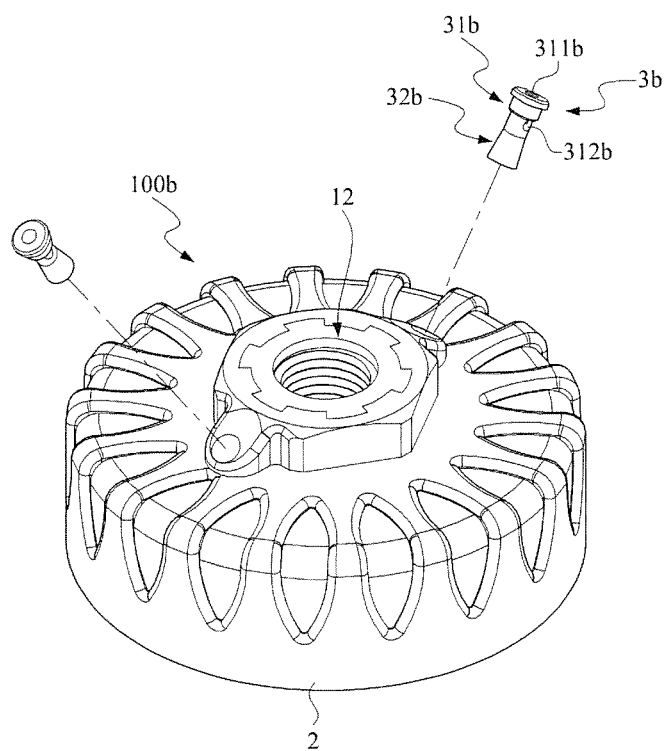
FIG. 7 is a three-dimensional and partial breakdown view of a cap according to a third embodiment of the present invention.
Figure 8:
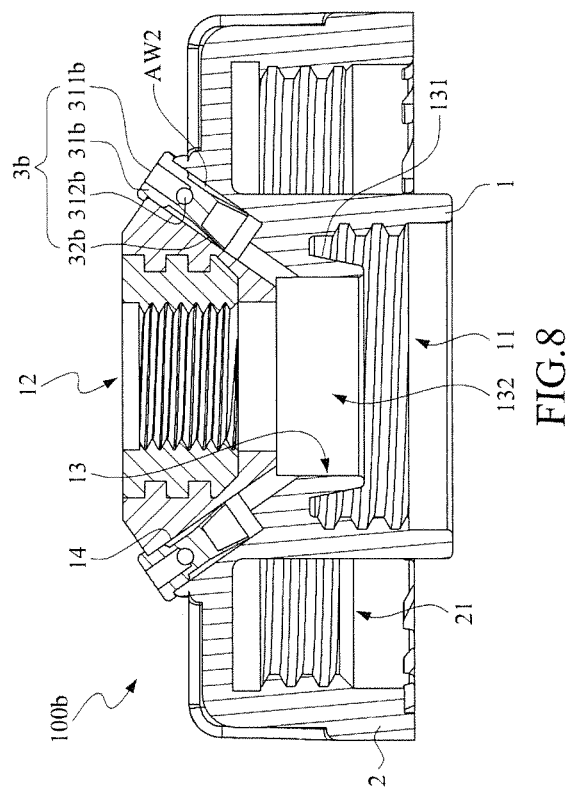
FIG. 8 is a cross-sectional view of the cap according to the third embodiment of the present invention.

Refer to FIG. 7 and FIG. 8; FIG. 7 is a three-dimensional and partial breakdown view of a cap according to a third embodiment of the present invention; FIG. 8 is a cross-sectional view of the cap according to the third embodiment of the present invention. A cap 100b is provided according to the third embodiment of the present invention. The cap 100b is similar to the cap 100 in the first embodiment of the present invention, but the cap 100b includes two valve modules 3b instead of two valve modules 3; therefore, the following only describes the valve modules 3b.

The valve module 3b is disposed in the holding space 14. An air way AW2 is formed between the valve module 3b and the holding space 14. The valve module 3b includes an inlet part 31b and an elastic sealing part 32b. The inlet part 31b is attached fixedly in the holding space 14 and includes an inlet hole 311b and a side hole 312b connecting the air way AW2. The side hole 312b connects the inlet hole 311b and the inlet hole 311b connects the air way AW2 via the side hole 312b. The difference between the valve module 3b and the valve module 3 is that the elastic sealing part 32b is integrally connected with the inlet part 31b and elastically seals the holding space 14. Since the function of the elastic sealing part 32b is the same as the elastic sealing part 32a in the second embodiment of the present invention, the elastic sealing part 32b will not be described again here.

Figure 9:
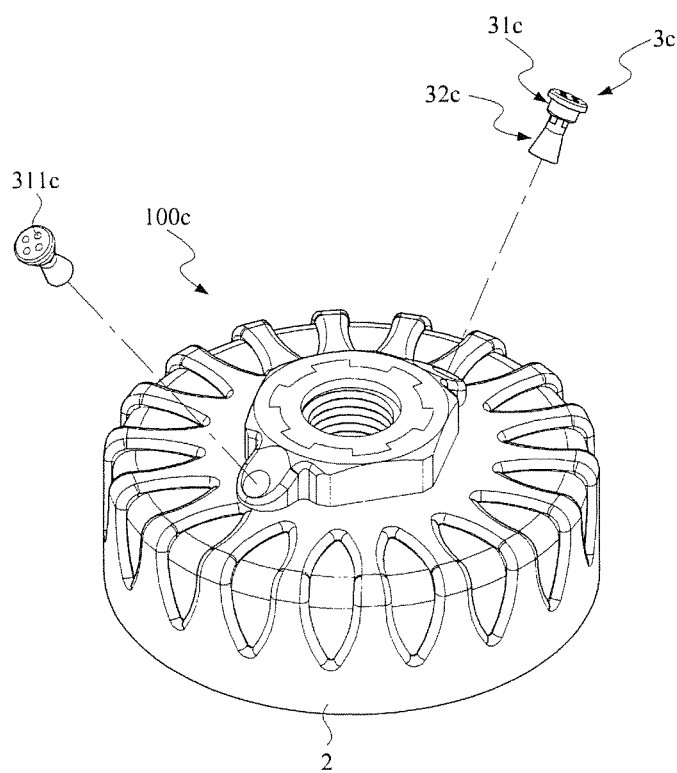
FIG. 9 is a three-dimensional and partial breakdown view of a cap according to a fourth embodiment of the present invention.
Figure 10:
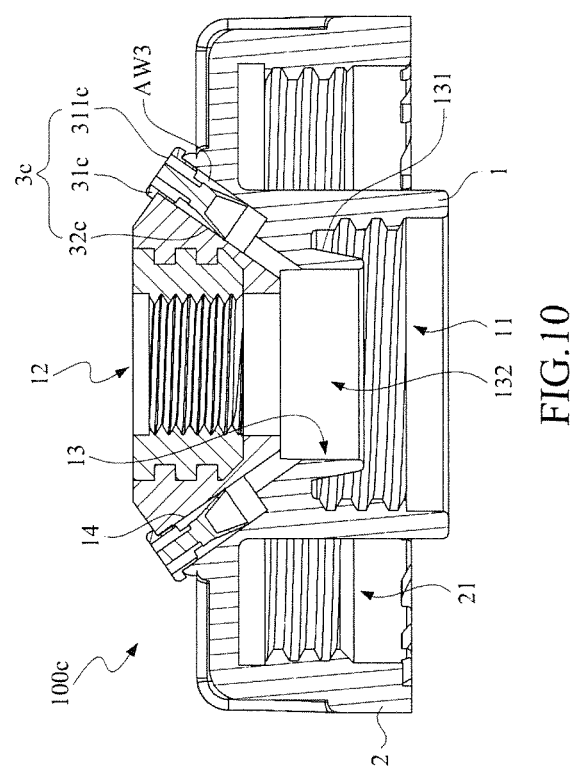
FIG. 10 is a cross-sectional view of the cap according to the fourth embodiment of the present invention.

Refer to FIG. 9 and FIG. 10; FIG. 9 is a three-dimensional and partial breakdown view of a cap according to a fourth embodiment of the present invention; FIG. 10 is a cross-sectional view of the cap according to the fourth embodiment of the present invention. A cap 100c is provided according to the fourth embodiment of the present invention. The cap 100c includes the main body 1, the extension body 2 and two valve modules 3c. The cap 100c is similar to the cap 100 in the first embodiment of the present invention, but the cap 100c includes the valve modules 3c instead of the valve modules 3; therefore, the following only describes the valve modules 3c.

The valve module 3c is disposed in the holding space 14. An air way AW3 is formed between the valve module 3c and the holding space 14. The valve module 3c includes an inlet part 31c and an elastic sealing part 32c. The inlet part 31c is attached fixedly in the holding space 14 and includes four inlet holes 311c. The difference between the valve module 3c and the valve module 3a is that the elastic sealing part 32c is integrally connected with the inlet part 31c and elastically seals the holding space 14, and the inlet holes 311c directly connect the air way AW3.

Figure 11:
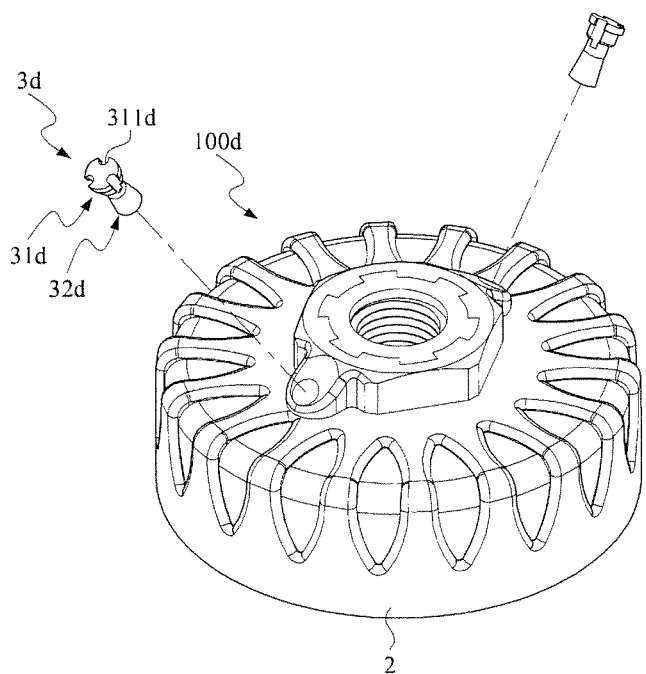
FIG. 11 a three-dimensional and partial breakdown view of a cap according to a fifth embodiment of the present invention.
Figure 12:
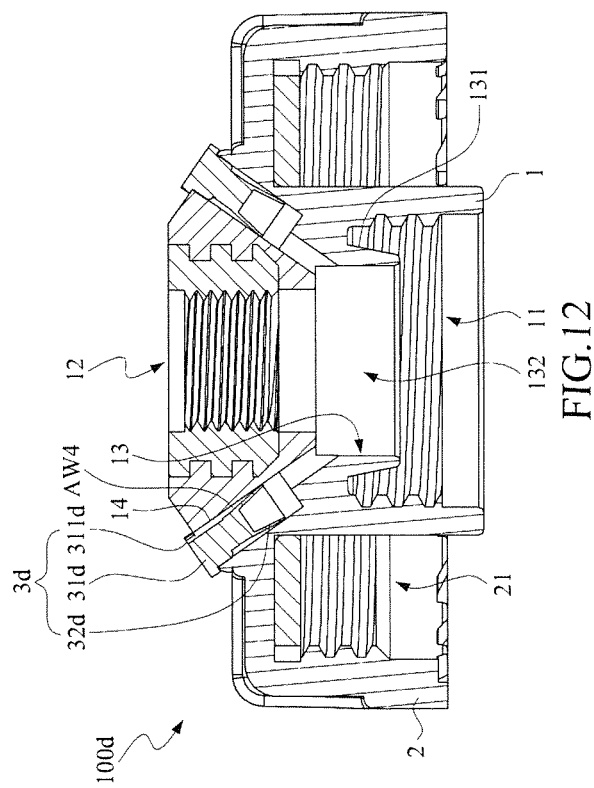
FIG. 12 is a cross-sectional view of the cap according to the fifth embodiment of the present invention.

Refer to FIG. 11 and FIG. 12; FIG. 11 a three-dimensional and partial breakdown view of a cap according to a fifth embodiment of the present invention; FIG. 12 is a cross-sectional view of the cap according to the fifth embodiment of the present invention. A cap 100d is provided according to the fifth embodiment of the present invention. The cap 100d includes the main body 1, the extension body 2 and two valve modules 3d. The cap 100d is similar to the cap 100 in the first embodiment of the present invention, but the cap 100d includes the valve modules 3d instead of the valve modules 3; therefore, the following only describes the valve modules 3d.

The valve module 3d is disposed in the holding space 14. An air way AW4 is formed between the valve module 3d and the holding space 14. The valve module 3d includes an inlet part 31d and an elastic sealing part 32d. The inlet part 31d is attached fixedly in the holding space 14 and includes three inlet holes 311d. The difference between the valve module 3d and the valve module 3 is that the elastic sealing part 32d is integrally connected with the inlet part 31d and elastically seals the holding space 14, and the inlet holes 311d are attached closely to the holding space 14 and directly connect the air way AW4.

While the present invention has been particularly shown and described with reference to a preferred embodiment, it will be understood by those skilled in the art that various changes in form and detail may be without departing from the spirit and scope of the present invention.

What is claimed is:

1. A cap for a drain hose and a plurality of bottles with different opening sizes, the cap comprising:
    a main body having a holding space, and including a main sleeve, a sleeve for drain hose and a leakage-proof part, wherein the main sleeve is for engaging with a first bottle, the sleeve for drain hose is for engaging with the drain hose, the leakage-proof part is for closely sealing the opening of the first bottle, and the leakage-proof part has a regulation space connecting the main sleeve, the sleeve for drain hose and the holding space;
    an extension body formed integrally with the main body and extending outwardly from the main body, the extension body including an extension sleeve for engaging with a second bottle, the opening size of the second bottle being larger than the opening size of the first bottle; and
    a valve module disposed in the holding space.

2. The cap according to claim 1, wherein the valve module includes a sealing element, an elastic element and an air valve, the elastic element supporting the sealing element so the sealing elements seals the air valve.

3. The cap according to claim 1, wherein the valve module includes a check valve.

4. The cap according to claim 1, wherein the main sleeve is threaded.

5. The cap according to claim 1, wherein the sleeve for drain hose is threaded.

6. The cap according to claim 1, wherein the extension sleeve is threaded.

7. The cap according to claim 1, wherein the leakage-proof part includes an inclined plane for closely sealing the opening of the first bottle.

8. The cap according to claim 1, wherein an air way is formed between the valve module and the holding space, the valve module including an inlet part and an elastic sealing part, the inlet part attached fixedly in the holding space and including at least an inlet hole connecting the air way, the elastic sealing part coupled to the inlet part and elastically sealing the holding space so as to connect the air way with the regulation space when the pressure in the air way is greater than that in the regulation space.

9. The cap according to claim 8, wherein the inlet part and the elastic sealing part are integrally coupled with each other.

* * * * *